Nov. 23, 1937.  E. C. HORTON  2,100,055
WINDOW CLEANER
Filed April 26, 1935   2 Sheets-Sheet 1
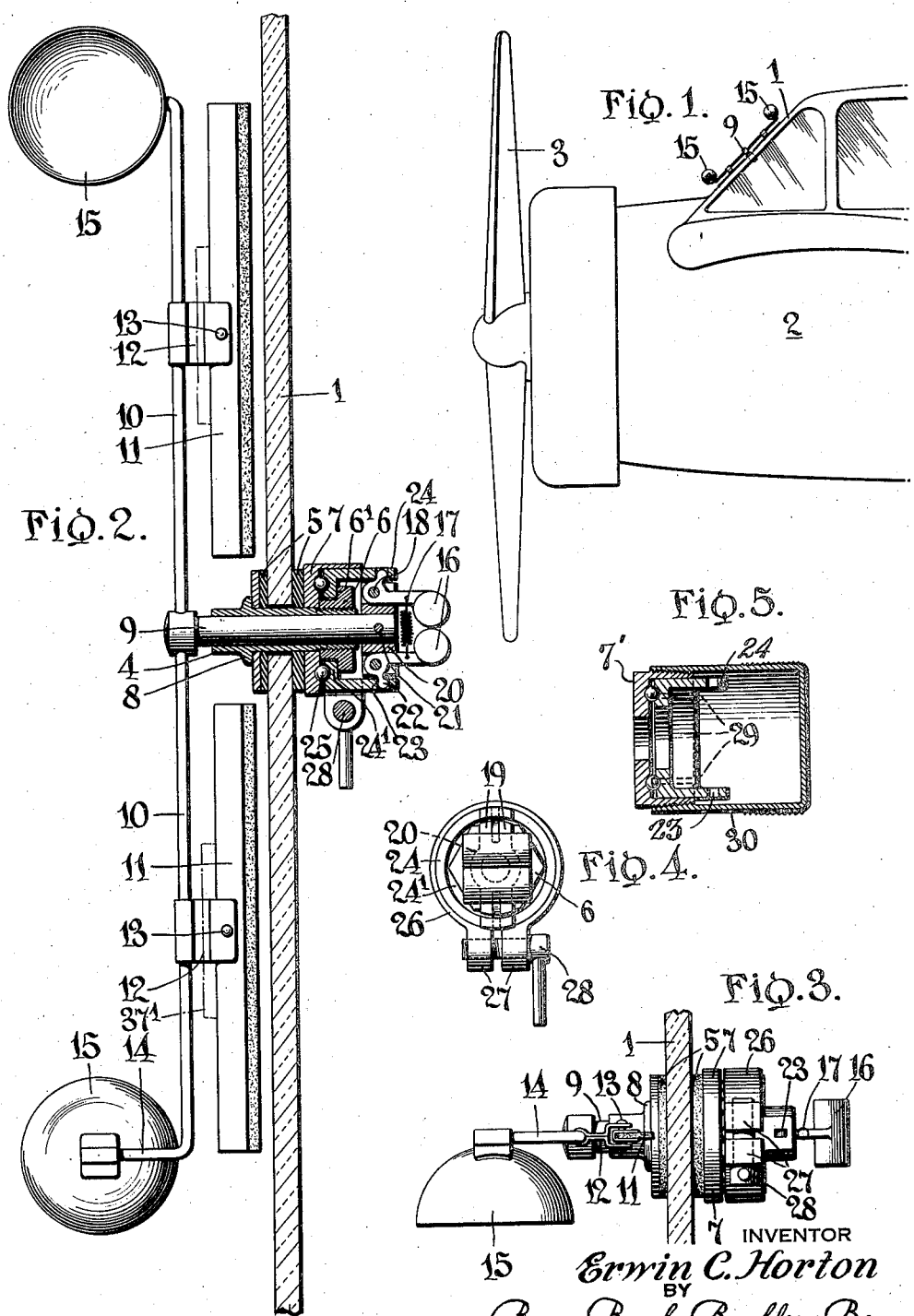
INVENTOR
Erwin C. Horton
BY
Beau, Brooks, Buckley & Beau
ATTORNEYS Nov. 23, 1937.  E. C. HORTON  2,100,055
WINDOW CLEANER
Filed April 26, 1935
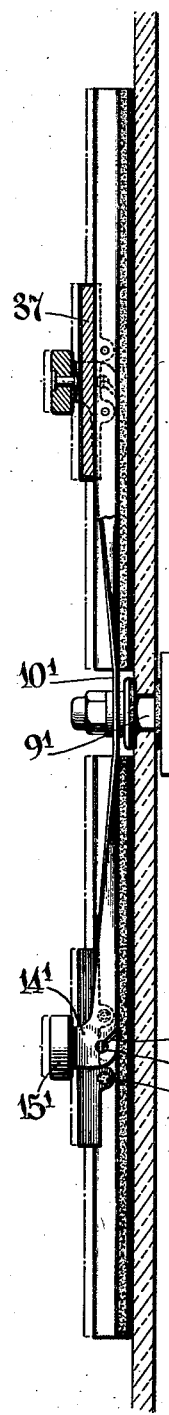
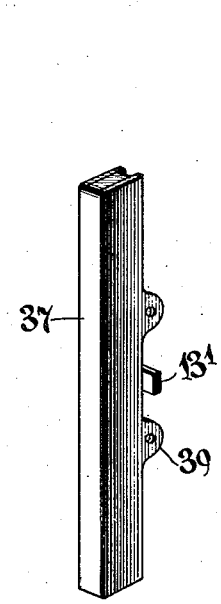
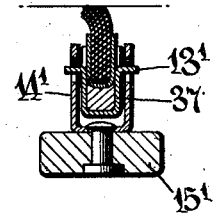
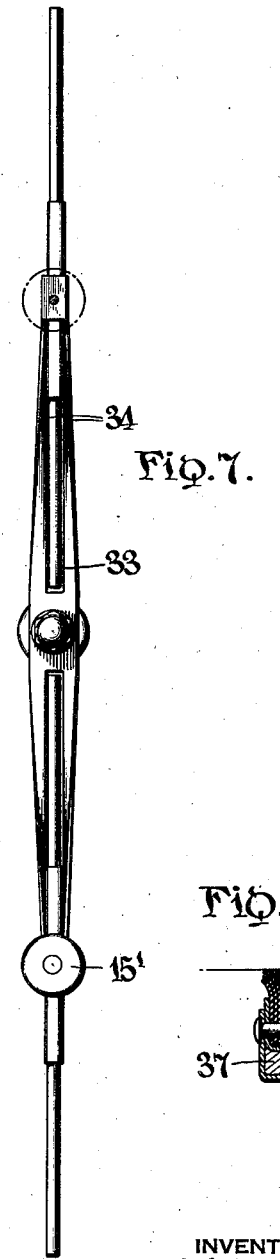
INVENTOR
Erwin C. Horton
BY
Bean, Brooks, Buckley & Bean
ATTORNEYS Patented Nov. 23, 1937

2,100,055

UNITED STATES PATENT OFFICE 2,100,055

WINDOW CLEANER

Erwin C. Horton, Hamburg, N. Y., assignor to Trico Products Corporation, Buffalo, N. Y.

Application April 26, 1935, Serial No. 18,474

12 Claims. (Cl. 15—250)

This invention relates to a cleaner for windows or windshields of airplanes, or other motor vehicles, and has particular reference to that type of cleaners in which the wiping element is rotated in one direction about an axis substantially at a normal to the window surface.

It has heretofore been proposed to provide window cleaners of different character in which the wind currents act on rotatably supported wind cups to operate the window wiping element. A construction of this design has been disclosed in Patent No. 1,920,144 granted July 25, 1933, to Henry Hueber and myself. In the construction disclosed therein the wiper members rested constantly upon the glass and necessitated a special mounting, more or less objectionable in that it tended to obscure the vision through the window; and further, no means were provided for holding the cleaner inoperative during fair weather conditions.

The present invention has for its primary object to provide a window cleaner of this general design which is more efficient and satisfactory in its use and mounting, and further, one wherein the wiper element is brought into firm wiping contact with the windshield glass when operating and is relieved against firm pressure on the glass when not operating.

In the drawings:

Fig. 1 is a fragmentary showing of an airplane equipped with a window cleaner embodying one form of the present invention;

Fig. 2 is an elevation of the cleaner with portions in section to more clearly illustrate the mounting of the same on the window;

Fig. 3 is an elevation of the window cleaner from a point of view at right angles to that of Fig. 2;

Fig. 4 is an inside elevation of the governor end of the cleaner;

Fig. 5 is a sectional view of a slightly modified brake for securing the cleaner inoperative;

Fig. 6 is a view similar to Fig. 2 but depicting a further modification of the present invention;

Fig. 7 is an outside elevation thereof;

Figs. 8 and 9 are sectional views through the wiper and its mounting; and

Fig. 10 is a detailed perspective view of the wiper counterpoise.

Referring to Fig. 1, the window cleaner is preferably mounted on the forward sloping window or windshield 1 of the airplane 2 and immediately behind the propeller 3 when it is desired to have the strong wind currents from the latter, and also those incidental to the travel of the vehicle, act directly as a driving force for the windshield cleaner.

Referring particularly to Fig. 2, the window glass 1 is provided with an aperture in which is inserted a bushing or sleeve 4 that is suitably packed by gaskets 5 against the weather as well as against the transmission of mechanical vibration to the glass, the sleeve being threaded at one end to receive a clamp nut 6. A fixed bearing plate 7 is secured against the inner side of the window by the clamping nut 6, the latter coacting with an exteriorly disposed shoulder 8 on the sleeve or bushing 4 to firmly secure the several parts in position on the window.

Journalled in the bushing 4 is the windshield cleaner shaft 9, the same being mounted therein for both rotative and slidable movement. Fixed on the outer end of the shaft is a plurality of resilient wiper carrying arms 10 extending therefrom substantially in a radial direction and each supporting a wiper blade 11. These wiper elements are normally supported out of contact with the glass and are given pivotal suspension from the arms by bracket clips 12 so that the wiping edge of each wiper may readily adjust itself to full wiping engagement with the glass when the arms are moved toward the same, the wiper elements being pivotally connected to the bracket clips 12 for limited pivotal movement by means of pins 13.

The wipers may be driven in a positive manner through the shaft 9, as in Fig. 6, or the outer end portions of the wiper arms may be provided with angular extensions 14 to support the wind driven cups 15. These cups further serve as weights and, under centrifugal force, act to spring the arms inwardly toward the glass and thereby increase the wiping pressure.

Means also may be provided for shifting the shaft axially when the latter is rotated so as to bring the normally spaced wipers down against the glass for wiping. According to the present disclosure such means embodies a pair of centrifugal weights 16 adapted to fly apart under centrifugal force against the urge of a connecting spring 17, the weight members 16 being pivotally mounted at 18 between pairs of ears 19 on a collar 20 that is keyed or fixed to the inner end of the shaft 9, as by cross pin 21. The centrifugally operated members 16 are provided with bell crank extensions 22 which engage in recesses 23 provided in a brake drum 24. This drum rotates with the shaft 9 and is given anti-friction support on the plate 7 by the thrust ball bearings 25, being held in position by its inwardly extending flange 24' cooperating with the overhanging retaining flange 6' of the clamping nut 6.

In operation, with the wind acting on the cups 15 to rotate the wipers, the likewise rotating weights 16 will throw outwardly about their points of fulcrum in the recesses 23 and exert an inward pull on the shaft so as to bring the wipers firmly into contact with the window glass. When the cleaner comes to rest the spring 17 will pull the weight members 16 together and therethrough push the shaft 9 outwardly to lift the wipers on the glass, depending upon the extent of axial movement permitted the shaft. Furthermore, the arms 10, being slightly resilient, are given an inward deflection resulting from the centrifugal force as well as the wind passing off the outer edges of the cups. This will urge the wipers toward the glass and insure a firm wiping contact.

Means are provided for arresting the cleaner and for holding the same inoperative during fair weather, such means being in the form of a split brake shoe 26 encircling the brake drum 24 and being conveniently carried by the bearing plate 7. The ends of the brake shoe are provided with ears 27 which are drawn toward one another by a clamp screw 28 to contact the shoe about the brake drum and thus secure the latter against rotation.

A modified embodiment of this brake is illustrated in Fig. 5 wherein the brake shoe 7' is split to provide a plurality of resilient sections 29 having their exterior surfaces tapered and threaded to receive a threaded clamp member or ring 30 so that when the ring is threaded onto the tapered shoe the sections of the latter will contact about the drum 24 and firmly secure the cleaner in a fixed position. This ring may be in the shape of a cup or housing so as to enclose the governor parts and thus enclose the revolving weights.

In the embodiment illustrated in Figs. 6-10, the wind cups have been eliminated, since the cleaner is in this instance driven in a positive manner, as by the motor 32 of any desired type.

The wiper arms 10' are resilient and preferably formed of sheet metal, the outer arm portions being slotted as at 33 to receive wipers 11. The bifurcated portions 34 are turned out of coplanar relationship into substantial parallelism with each other to define channels at the outer ends of the arms to more readily receive the wipers 11. The parallel extremities of the arm portions thus formed are provided with bearing openings 35 and also entrance ways 36 leading to such openings. The wiper is provided with oppositely extending and preferably flattened trunnions 13' for entrance through the ways 36 into such bearings 35. These trunnions provide pivotal support for the wiper in a plane of movement perpendicular to the windshield glass. The outer ends of the arms have angular extensions 14' to support the weights 15' so that under the influence of centrifugal force, the wiper carrying arms will spring inward toward the glass and therefore bring their wipers into firm wiping engagement therewith.

In both forms of the invention the wipers are suspended above the longitudinal center lines by their pivots or trunnions 13 or 13', and because of this there will be a tendency for the inner end of the wiper to be thrown into firmer engagement with the glass than the outer end during the rotation of the cleaner. To counteract this tendency, the back of the wiper is provided with a counterpoise 37 to evenly balance the wiper on opposite sides of the longitudinal axis of the wiper. The counterpoise may be fastened to the wiper in any approved manner, as by means of rivets 38 passed through the back of the wiper and the ears 39 of the counterpoise. For simplicity of manufacture the trunnions 13' may be formed or carried by the counterpoise. The counterpoise member 37, with its oppositely extending trunnions 13' serves as a cradle which is rockingly mounted in the arm bearings 35. In this cradle member the wiper blade is attached either permanently or in a detachable manner, as above set forth. In Fig. 2 the counterpoise or cradle members have been indicated by the dotted lines 37'.

In the form shown in Fig. 6, the shaft 9' will be maintained in its arrested position by its driving member 32 so as to properly hold the wiper members against idle rotation when the use of the cleaner is not desired. By reason of the resilient arms the wipers will be supported out of contact with the window surface or, at the most, in very light contact therewith, so that the wiping edge, which is usually of ply rubber, will not become set in any deformed shape. As soon as the shaft is rotated, centrifugal action will begin to play its part in pressing the wipers into proper engagement with the glass for the efficient cleaning thereof. The wiping contact or pressure against the glass will be maintained substantially uniform throughout by reason of the counterpoise acting to counterbalance the wipers which are otherwise mounted close to their back edge, whereby to provide the desired wiping edge contact.

I claim:

1. A window cleaner comprising a support, a shaft mounted thereon for both axial and rotational movements, wiper means connected to the shaft and adapted to be moved thereby during its axial movement into firm wiping contact with the window surface, a brake member rotatably mounted on the support, centrifugally responsive means movably connected to both the shaft and the brake member to rotate therewith, said responsive means having parts acting on the shaft to also move it axially, resilient means urging the responsive means to its normal position and acting to return the shaft axially for relieving the pressure in the wiping contact when the wiping means is at rest, and means cooperating with the brake member to arrest the rotational movement of the shaft while permitting freedom of axial movement under the urge of said resilient means.

2. A window cleaner comprising a shaft mounted substantially at a normal to the window surface to be cleaned and mounted for axial movement, said shaft projecting from opposite sides of the window, a plurality of wiper arms fixed to the outer end of the shaft, wiper elements carried by the arms, means carried by the shaft for being acted upon by the wind to rotate the shaft, centrifugal governor means connected to the inner end of the shaft for exerting an inward pull on the shaft to thereby urge a firm pressure in the wiping contact of said wiper elements on the glass, said governor means comprising a rotational part, centrifugally responsive members movably connected with said rotational part and with said shaft and acting under centrifugal force to pull the shaft inwardly, and spring means constraining said centrifugally responsive members against operation and serving to return them and said shaft to a normal position whereby to relieve the pressure in the wiping contact, and means for engaging said rotational part for arresting the cleaner while still permitting the spring means to function freely in restoring the shaft and centrifugally responsive members to a normal position.

3. A window cleaner comprising a shaft journalled for rotation, a plurality of resilient arms fixed radially on the shaft, a wiper pivotally attached to each arm and normally held thereby out of firm wiping contact with the window surface to be cleaned but adapted to be brought by the bending of the arm into such wiping contact, said arms having angularly extending terminal parts, and means on said parts adapted under centrifugal action to produce a bending movement in the arms toward the window surface to urge the wipers into firm wiping contact with the glass, said terminal parts extending away from the adjacent wipers and the pivotal suspension of the wipers permitting the latter to accommodate themselves for proper wiping engagement with the glass.

4. A window cleaner comprising a shaft journalled for rotation, a plurality of resilient arms fixed radially on the shaft and adapted for bending toward the window surface to be cleaned, a wiper attached to each arm and normally held thereby out of firm wiping contact with the window surface to be cleaned, and wind driven means connected to the outer end portions of the arms for rotating the shaft and adapted through centrifugal action to bend the resilient arms for urging the wipers into firm wiping contact with the window surface, said wind driven means being offset from the plane of the respective arms in a manner to create a bending moment on the arm toward the window surface.

5. A window cleaner comprising a shaft mounted for rotative and axial movement with its outer end extending from the outer surface of the glass and its inner end extending from the inner surface of the glass, wiper means connected to the outer end of the shaft, wind driven means for rotating the shaft, centrifugally operated members carried by the inner end of the shaft, said members having lever extensions, a rotatable support on which said extensions fulcrum, resilient means normally holding said centrifugally operated members against separation and thereby acting through the support to move the shaft axially in an outward direction to relieve the wiping contact of said wiping means on the glass, and means acting on the rotatable support to arrest the shaft while permitting the latter to be acted upon by said resilient means, 6. A window cleaner comprising a support, a shaft mounted thereon for rotative and axial movement, wiper means carried by the outer end of the shaft, wind driven means for rotating the shaft, centrifugally operated means carried by the inner end of the shaft and operating in response to the rotation of the shaft to slide the latter inwardly, said centrifugally operated means having a rotating brake surface, resilient means yieldably holding said shaft outwardly to relieve the wiping contact of said wiping means on the glass, and brake means on the support cooperating with said brake surface to arrest and secure the cleaner in an inoperative position while permitting said resilient means to function in holding the shaft outwardly.

7. A windshield cleaner having a rotative shaft, radial arms extending therefrom, a wiper for each arm pivoting thereon for movement in a plane substantially perpendicular to the window surface, means for rotating the shaft, and counterpoise means connected to the wiper in a manner to act under centrifugal force to maintain the same in substantial wiping engagement with the surface.

8. A window cleaner having a rotary shaft substantially normal to the window surface to be cleaned, wiper carrying arms radiating therefrom, a wiper carried by each arm, each arm having a resilient portion adjacent the shaft and their outer ends provided with upstanding parts extending away from the window surface, and centrifugally responsive means on the arm extensions for bending the arms toward the window surface thereby to urge their supported wipers into firm wiping contact with such surface.

9. A window cleaner having a shaft, a wiper carrying arm connected thereto and having opposed bearings, a counterpoise member having trunnions journalled in the bearings, and a wiper carried by the counterpoise member, the trunnions being disposed in a manner to have the counterpoise member balance the wiper against movement under centrifugal force.

10. A window cleaner having a shaft, a wiper carrying arm connected thereto and having opposed bearings, a cradle member, and a wiper member, one of said members having trunnions journalled in the bearings, the cradle member being weighted and disposed on the opposite side of the pivotal axis of the trunnions from the wiper to counterpoise the wiper when the shaft is rotated.

11. A window cleaner having a rotary shaft, resilient wiper carrying arms extending radially therefrom, a wiper carried by each arm, said arms adapted to be sprung toward the window surface to bring the wiper into firmer wiping contact with the window surface, and means carried by each arm and adapted to move outwardly under centrifugal force to so spring the arm, said arm carried means being offset from the plane of its arm in a manner to create a bending moment on the arm toward the window surface.

12. A windshield cleaner having a rotary shaft, radial arms extending therefrom, a wiper for each arm, each wiper being of strip-like form with one longitudinal edge serving as a wiping edge, means pivotally mounting each wiper to an arm with a transverse pivotal axis being disposed substantially midway of the length of the wiper and adjacent the opposite edge, whereby when the shaft is rotated a centrifugal force will tend to swing the inner end of the wiping edge into firmer contact with the windshield surface, and counterpoise means carried by each wiper in a manner to balance the wiper and thereby counteract such centrifugal force.

ERWIN C. HORTON.